United States Patent Office 3,546,170
Patented Dec. 8, 1970

3,546,170
STABILIZED METHYLTHIO AND METHYLTHIO-
METHYLENE SUBSTITUTED POLY(PHENYLENE
OXIDE) COPOLYMERS
Allan S. Hay, Schenectady, N.Y., assignor to General
Electric Company, a corporation of New York
No Drawing. Filed Dec. 23, 1968, Ser. No. 786,412
Int. Cl. C08g 23/18
U.S. Cl. 260—47
4 Claims

ABSTRACT OF THE DISCLOSURE

Poly(phenylene oxide) copolymers having a molecular weight of at least 10,000 whose repeating units have both the formula A
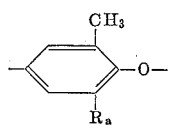

and the formula

B
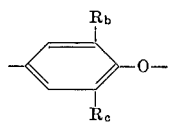

where $R_a$ is methyl or phenyl, $R_b$ is $CH_3$—S— or $CH_3$—S—$CH_2$— and $R_c$ is methyl or phenyl and, in addition, $CH_3$—S—$CH_2$— when $R_b$ is also $CH_3$—S—$CH_2$—, the number of B units being from 0.5 to 10 mole percent of the total of A and B units, have been found to be stable towards thermal degradation. Because of their stability, these compositions can be used to prepare molded or other shaped objects for high temperature applications.

This invention relates to poly(phenylene oxides) which are stabilized towards thermal degradation. More specifically, this invention relates to poly(phenylene oxide) copolymers in which one, but not all of the repeating units of the copolymer has either a methylthio substituent in the 2-position or a thiomethoxymethyl substituent in either one or both of the 2- and 6-position relative to the oxygen of the phenylene ether unit. Such compositions have been found to be more stable at elevated temperatures than the homopolymers or copolymers not containing such a sulfur atom. Capping of the terminal hydroxy groups further increases this stability.

Poly(phenylene oxides), sometimes known as polyphenylene ethers, as a general class, are an extremely interesting group of new polymers. These polymers, both homopolymers and copolymers, and processes of producing them are disclosed in my U.S. Pats. 3,306,874 and 3,306,875, and my copending application, Ser. No. 593,733, now U.S. Pat. 3,432,466 filed Nov. 14, 1966, and assigned to the same assignee as the present invention which are incorporated by reference. These poly(phenylene oxides) have many desirable properties and have found wide commercial acceptance. Generally, these poly(phenylene oxides) are poly(2,6-disubstituted-1,4-phenylene oxides) which are made by oxidative coupling of 2,6-disubstituted phenols.

For high temperature applications in the presence of air or other oxygen containing gas, it has been found that these poly(phenylene oxides) preferably should be capped, i.e., have the terminal hydroxyl group converted to a substituent which is oxidatively stable. This can be done by any of the known general procedures used for capping hydroxyl terminated polymers, but preferably by hot-capping as disclosed and claimed in U.S. Pat. 3,375,228—Holloch and Van Sorge, which also develops and caps any incipient hydroxyl groups. However, it has been noted that these capped poly(phenylene oxides) containing an alkyl substituent on the benzene nucleus are still somewhat reactive with oxygen. On long exposure to high temperatures in the presence of oxygen containing gas, these alkyl groups are themselves slowly oxidized causing cross-linking. In the form of films where a high surface to volume ratio exists, this cross-linking is evident because the films will slowly embrittle at elevated temperatures, as determined by the time required for the fold number, to decrease to zero in a standard fold test. The fold number, as used herein, is determined by subjecting a 14 mil thick strip of film to aging in an air oven at 175° C. Periodically, the film is removed and subjected to the fold test which consists in folding the film 180° and pressing the two halves firmly together without creasing them. Thereafter, the film is folded at the same place in the opposite direction through 360° C. This folding and refolding through 360° is continued until a crease forms with sufficient failures in the film along the crease line that a slight pull on the film separates the film into two pieces. The fold number is the total number of folds required to produce this failure. This test is continued until the film can not take one fold. The plotting of the data of the fold number vs. the time of heating permits a smooth curve to be drawn correlating the decrease in fold number with time of heating and the determination of the time to embrittlement, i.e., the minimum number of hours of heating at 175° C. required to cause the film to fail on the first fold.

It has been proposed to incorporate elemental sulfur or sulfur containing compounds such as, mercaptoimidazoles, mercaptothiazoles, etc., preferably in the form of their benzoate esters in poly(phenylene oxides) to increase the time to embrittlement. The use of sulfur or these sulfur materials causes trouble because of their disagreeable odor or because of corrosion problems when the polymers are used in contact with the metals. Furthermore, the oxidation products of these stabilizers are generally highly colored and produce darkening of the polymer.

Up to now, poly(phenylene oxides) which contain sulfur in the polymer molecule have not been known. To produce such poly(phenylene oxides), phenols containing sulfur in the substituents in the 2- or 6-position are required. I have now prepared poly(phenylene oxide) copolymers in which one of the components of the copolymer contains sulfur in the substituent groups on the benzene nucleus of the polymer. It was indeed surprising to find that the polymer needed to contain only a very small amount of the sulfur containing moiety to double the time to embrittlement compared to the homopolymer prepared from the non-sulfur containing phenol making up the balance of the copolymer. This improvement in stability was noted with the uncapped poly(phenylene oxide), the normally capped poly(phenylene oxide) as well as the hot-capped poly(phenylene oxide) when compared to the corresponding uncapped, capped and hot-capped homopolymer. Furthermore, these copolymers did not have nor did they develop a disagreeable odor on aging.

The amount of sulfur containing repeating units needed in the poly(phenylene oxide) copolymer to obtain these desirable effects, can be as low as 0.5 mole percent of the total number of repeating units. Increasing the amount of sulfur containing units up to 10 mole percent, with the balance being any of the repeating units of the known poly(phenylene oxide), further enhances the stability. No further significant improvement in stability is gained by exceeding this upper limit to warrant the additional cost of this more expensive component. In order that such copolymers have any useful properties, the copolymer should have a number average molecular weight of at least 10,000. Such poly(phenylene oxides) have repeating units that have both the formula

I

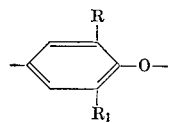

and the formula

II

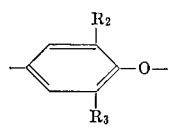

where R is alkyl, free of tertiary α-carbon atom, haloalkyl, free of tertiary α-carbon atom and the halogen substituent is other than one the α-carbon atom, $R_1$ is the same as R and in addition, aryl or haloaryl, $R_2$ is alkylthioalkyl, free of a tertiary α-carbon atom or alkylthio, and $R_3$ is the same as $R_1$ and in addition alkylthioalkyl. Typical examples of the substituents that R and $R_1$ can be and means of making these copolymers are disclosed in my above referenced patents. Typical examples of the alkylthioalkyl and alkylthio substituents that $R_2$ and $R_3$ can be are those having the formulas

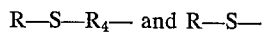

where R is defined as above and $R_4$ is any alkylene group, i.e., a divalent alkyl group, corresponding to any of the alkyl groups defined above by R.

An increase in the number of carbon atoms in the substituents on the benzene nucleus of the poly(phenylene oxide) repeating units does not impart any outstanding properties of the poly(phenylene oxide) over that obtained when the substituents have a lower number of carbon atoms. Furthermore, many of the higher homologs of the starting 2,6-disubstituted required to make such poly (phenylene oxides) are not as readily available as the lower members of the series, especially those having methyl or phenyl substituents. Therefore, the particular poly (phenylene oxide) copolymers which are preferred for this invention are those poly(phenylene oxides) within the broad class described above which are poly(phenylene oxide) copolymers having a number average molecular weight of at least 10,000 whose repeating units have both the formula

A

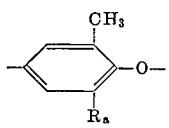

and the formula

B

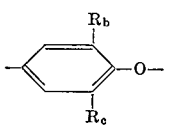

where $R_a$ is methyl or phenyl, $R_b$ is $CH_3$—S— or $$CH_3-S-CH_2-$$

and $R_c$ is methyl or phenyl and in addition $CH_3$—S—$CH_2$ when $R_b$ is also $CH_3$—S—$CH_2$— and the number of B units are from 0.5 to 10 mole percent of the total of A and B units. Because of their stability, these compositions can be used to prepare molded objects, films, fibers, and other shaped objects for high temperature applications.

These copolymers are made, as mentioned previously, by the oxidative coupling of the corresponding phenols. The phenols required to produce poly(phenylene oxides) having the repeating units defined by Formula A are 2,6-dimethyl phenol (2,6 - xylenol) and 2-methyl-6-phenylphenol. 2,6-dimethylphenol is readily available as a by-product from coal tar or from the direct methylation of either phenol or o-cresol. 2-methyl-6-phenylphenol is readily produced by the direct methylation of o-phenylphenol. The direct methylation of phenol, o-cresol or o-phenylphenol (2-phenylphenol) with high selectivity for ortho methylation is disclosed and claimed in the copending application of Stephen B. Hamilton, Jr., Ser. No. 371,189, now U.S. patent 3,446,856, filed May 29, 1964, and assigned to the same assignee as the present invention.

The phenols required to produce poly(phenylene oxides) having repeating units corresponding to Formula B are 2-methyl-6-(methylthio)phenol, 2 - phenyl-6-(methylthio)phenol, 2 - methyl - 6 - (thiomethoxymethyl)phenol, 2-phenyl-6-(thiomethoxymethyl)phenol and 2,6-bis(thiomethoxymethyl)phenol. The (methylthio)phenols are made by the method described by Wessely et al. in Monatsh. Chem. 91, 57–78 (1960) by oxidizing o-cresol or o-phenylphenol with lead acetate to produce the corresponding quinol ether which is then reacted with methyl mercaptan, and the reaction product rearranged with acetic acid to produce the corresponding phenol in which the methylthio group has been introduced into the 6-position of the starting phenol. The thiomethoxymethyl substituted phenols are made by reacting phenol, o-cresol or o-phenylphenol with dimethyl sulfoxide in acetic acid as described by Yoshiyuki Hayashi et al. in J. Org. Chem. 32, 457 (1967) and the references cited therein to introduce the thiomethoxymethyl ($CH_3$—S—$CH_2$—) group in the 6-position of o-cresol or o-phenylphenol or into both the 2- and 6-position of phenol. These phenols have alternative names, for example 2 - methyl-6-(thiomethoxymethyl)phenol is also known as 2-methyl-6-(methylthiomethyl)phenol and also as α-methylthio-2,6-xylenol.

In making the copolymers, the individual phenols may be mixed prior to oxidative coupling or one of the phenols may be oxidatively coupled and the other phenol or phenols to be copolymerized may be added thereafter to produce segmented copolymers. In general, the oxidative coupling reaction is carried out by passing air or other oxygen containing gas into a solution of an amine-basic cupric salt complex in an inert solvent, for example, toluene or benzene, which also either contains the phenols to be oxidatively coupled or the phenols are added over a period of time to the reaction mixture. Further details of this oxidative coupling reaction are disclosed in the above referenced patents which are incorporated by reference. After the oxidative coupling reaction is completed, the catalyst residue is removed or deactivated, for example, by washing the copolymer solution with water, generally containing an acid to extract the catalyst, by addition of a strong chelating agent, by adding a precipitant for the copper, by precipitation of the polymer from the reaction mixture, etc. Since further increase in the oxidative stability of the copolymer is obtained by capping if the polymer is to be capped, the catalyst is generally separated from or deactivated in the solution of the polymer to avoid having to redissolve the polymer prior to carrying out the capping reaction.

The capping reaction is carried out to convert the terminal hydroxyl groups to substituents which are inert, or at least highly resistant to an oxygen atmosphere at elevated temperatures. Various means can be used to cap the poly(phenylene oxide) copolymers, for example, ester groups can be formed on hydroxyl groups by reaction with the acid anhydrides or acyl halides. Ether substituents can be introduced by reaction with etherifying agents, such as dimethyl sulfate, alkyl halides in the presence of a base and copper, etc. They may be simultaneously decolorized and capped by reacting with an alkali metal adduct of a diaryl ketone and then reacted with a wide variety of capping agents as more fully disclosed in my copending application Ser. No. 672,956, now U.S. Pat. 3,402,143, filed Oct. 5, 1967 and assigned to the same assignee as the present invention.

Surprisingly enough, although hot-capping is preferable over other capping means for other poly(phenylene oxide) polymers and copolymers, hot-capping of the copolymers of this invention show no improvement over the capped polymers produced by normal capping means. However, they may be hot-capped if desired by the procedure shown in U.S. Pat. 3,375,228, Holoch and Van Sorge.

Where still further benefits are desired, copolymers made from phenols containing both the sulfur substituents of the present invention and also a phenol having a secondary α-carbon atom as disclosed in my copending application, Ser. No. 786,403 filed concurrently herewith and assigned to the same assignee as the present invention can be made. These copolymers in which one of the phenols used to make the copolymer contains a secondary α-carbon atom do require capping and preferably hot-capping.

Prior to or simultaneously with capping, the copolymer may be reduced by treatment with a metal and alkanoic acid as more completely disclosed in the copending application of Arnold Factor, Ser. No. 786,475, filed concurrently herewith and assigned to the same asignee as the present invention. This latter process, when applied to the copolymers of this invention to produce the capped poly(phenylene oxide) polymers, produces a final product having the maximum stability. However, the actual production of capped copolymers of this invention is not necessary for the practicing of this invention. However, when it is desired to gain the benefits of capping polymer, this may be done by any of the various means.

In order that those skilled in the art may better understand my invention, the following examples are given by way of illustration and not by way of limitation. In all the examples, parts and percentages are by weight and temperature is reported in degrees centigrade unless otherwise stated.

EXAMPLE 1

Oxygen was passed into a vigorously stirred solution of 0.3 ml. of N,N,N',N'-tetramethylethylenediamine, 1.18 g. of trimethyl amine and 0.2 g. of cuprous chloride in 200 ml. of benzene in which 10 g. of anhydrous magnesium sulfate was suspended. After all of the copper salt had dissolved, a solution of 19.8 g. of 2,6-xylenol and 0.2 g. of 2-methyl-6-(thiomethoxymethyl)phenol dissolved in 60 ml. of benzene was added dropwise to the reaction mixture which was immersed in a water bath at 25°. At the end of 26 minutes, the indicated intrinsic viscosity as determined by flow from a calibrated pipette was 0.6 dl./g. corresponding to a number average molecular weight of approximately 30,000. The solution was filtered through activated alumina which absorbs the copper catalyst and removed suspended magnesium sulfate. The polymer was precipitated by slowly adding methanol to the filtered solution until the solution clouded. At this point, an excess of methanol was added to completely precipitate all of the polymer. The polymer was isolated by filtration and dried.

Two portions of this copolymer were dissolved in benzene. One solution was titrated with the lithium ketyl of benzophenone until the color of the ketyl just persisted. Based on the weight of the lithium added, an excess of acetic anhydride was added. This reaction simultaneously decolorizes the polymer and converts the terminal hydroxyl groups to acetate groups and is typical of copolymer capped by the normal techniques. The other solution of the polymer was hot-capped by sealing the solution in a pressure vessel with excess acetic anhydride and heating to 250° for 20 minutes. A portion of the polymer solution which had been acetate capped by the lithium ketyl technique was also hot-capped. These three samples of capped copolymer were precipitated from their solutions by slowly adding methanol until the cloud point was reached and then adding excess methanol. These three samples of capped polymers will be designated CC for the polymer which is cold-capped by the lithium ketyl reaction, HC for the polymer which was hot-capped and CC-HC for the polymer which was cold-capped and then hot-capped as described above.

EXAMPLE 2

Using the procedure of Example 1, but using 19.4 g. of 2,6-xylenol and 0.6 g. of 2-methyl-6-(thiomethoxymethyl)-phenol, a copolymer containing approximately 2.4 mole percent of 2-methyl-6-(thiomethoxymethyl)-1,4-phenylene oxide units and 97.6 mole percent, 2,6-dimethyl-1,4-phenylene oxide units was prepared. This portion of this polymer were also hot-capped, cold-capped, cold-capped hot-capped.

EXAMPLE 3

Using the procedure of Example 1, a terpolymer was prepared using a mixture of 18.8 g. of 2,6-xylenol, 0.6 g. of 2-methyl-6-(thiomethoxymethyl)phenol and 0.6 g. of 2-methyl-6-(α-phenylethyl)phenol to yield a copolymer containing approximately 2.2 mole percent, 2-methyl-6-(thiomethoxymethyl)-1,4-phenylene oxide units, 1.8 mole percent of 2 - methyl - 6 - (α-phenylethyl)-1,4-phenylene oxide units and 96.0 mole percent of 2,6-dimethyl-1,4-phenylene oxide units. Sample portions of the copolymer were cold-capped, hot-capped and cold-capped-hot-capped, as described in Example 1.

EXAMPLE 4

Sheets, 14 mils thick, of the uncapped, cold-capped, hot-capped and cold-capped-hot-capped polymers of Examples 1, 2 and 3 were made by compression molding. Strips one quarter inch wide were cut from these sheets and heated at 175° in an air oven. Periodically, the strips were removed from the oven and subjected to the above-described fold test. The data is shown in Table I.

TABLE I

| Polymer | Time to embrittlement, hours | | | |
|---|---|---|---|---|
| | UC | CC | HC | CC-HC |
| Poly(2,6-dimethyl-1,4-phenylene oxide) | 32 | 60 | 80 | |
| Copolymer of Example 1 | 68 | 130 | 130 | 130 |
| Copolymer of Example 2 | 94 | 130 | 130 | |
| Copolymer of Example 3 | 42 | >130 | >130 | >130 |

It is obvious from Table I that the inclusion of the sulfur containing component of the copolymer has greatly increased the time to embrittlement over the homopolymer not containing the sulfur substituent. It is also evident that cold-capping is just as effective as hot-capping except in still further increasing the time to embrittlement. In the case of a polymer also containing a secondary α-carbon atom, it is obvious that the capping is required. It is further noted that this time to embrittlement increases as a function of the amount of sulfur containing component. This increase optimizes in the range of 4 to 6 mole percent so that it is desirable to limit the amount of the sulfur containing component to no greater than 10 mole percent.

Comparable results are obtained to those of the above examples when the 2,6-dimethyl phenol is replaced with 2-methyl-6-phenylphenol and also when the 2-methyl-6-thiomethoxymethylphenol is replaced with equivalent amounts of 2,6-bis(thiomethoxymethyl)phenol, 2-phenyl-6-(thiomethoxymethyl)phenol, 2 - methyl - 6 - (methylthio)phenol and 2-phenyl-6-(methylthio)phenol.

Although the above examples have shown various modifications and variations in the present invention, further modifications and variations are possible. For example, the copolymers can be blended with other polymers, such as polyolefins, polystyrene, polystyrene copolymers. Various fillers, dyes, pigments, fillers, etc., can be blended and compounded with the copolymers to modify the properties of the molded objects made from these copolymers. It is therefore to be understood that changes made may be made in the particular embodiments of the invention described which are within the full intended scope as the invention is defined by the appended claims.

The copolymers of this invention have a wide variety of uses. The poly(phenylene oxides) per se have excellent physical, mechanical, chemical and electrical properties. By increasing the time to embrittlement as disclosed herein, these polymers may be used to prepare fabricated and shaped objects which are capable of withstanding higher temperatures during use than the known poly(phenylene oxides).

What I claim as new and desire to secure by Letters Patent of the United States is:

1. Poly(phenylene oxide) copolymers, having a number average molecular weight of at least 10,000, whose repeating units have both the formula (A) 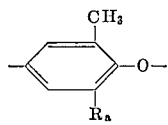

and the formula (B) 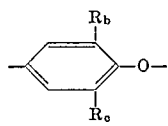

where $R_a$ is methyl or phenyl, $R_b$ is $CH_3$—S— or

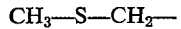
$CH_3$—S—$CH_2$— and $R_c$ is methyl or phenyl, and in addition,

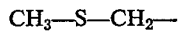
$CH_3$—S—$CH_2$— when $R_b$ is also $CH_3$—S—$CH_2$—, the number of B units being from 0.5 to 10 mole percent of the total of A and B units.

2. A poly(phenylene oxide) of claim 1 wherein the hydroxyl groups of the polymer have been capped by reaction with an agent capable of reacting with phenolic hydroxyl groups to convert them to substituents that are inert to oxygen attack at elevated temperature.

3. A poly(phenylene oxide) of claim 1 wherein the A units are 2,6-dimethyl-1,4-phenylene oxide units and the B units are 2-methyl-6-(thiomethoxymethyl)-1,4-phenylene oxide units.

4. A poly(phenylene oxide) of claim 3 wherein the hydroxyl groups of the polymer have been capped by reaction with an agent capable of reacting with phenolic hydroxyl groups to convert them to substituents that are inert to oxygen attack at elevated temperatures.

References Cited

UNITED STATES PATENTS

| | | | |
|---|---|---|---|
| 3,306,875 | 2/1967 | Hay | 260—47 |
| 3,375,228 | 3/1968 | Holoch et al. | 260—47 |
| 3,432,466 | 3/1969 | Hay | 260—47 |

WILLIAM H. SHORT, Primary Examiner

M. GOLDSTEIN, Assistant Examiner

U.S. Cl. X.R.

260—896, 897, 874